Figure 1:
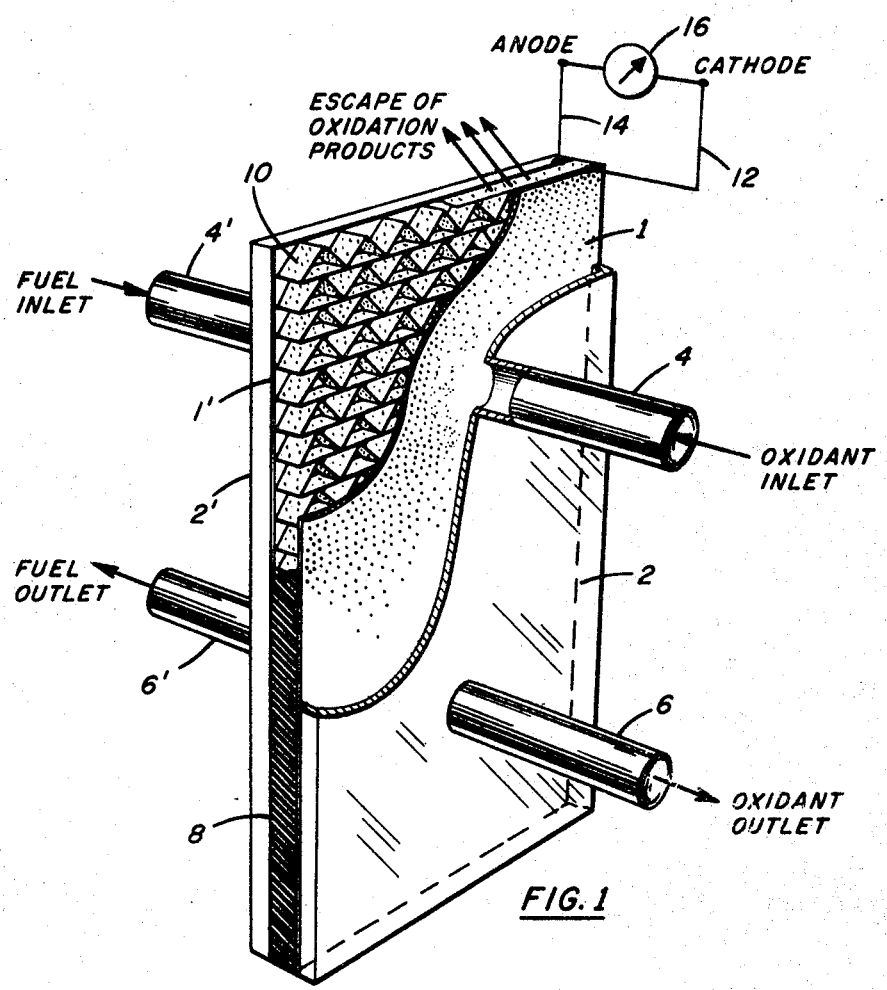

Sept. 14, 1965  W. JUDA  3,206,332
ELECTROLYTIC CELL STRUCTURE
Filed Nov. 24, 1961

WALTER JUDA INVENTOR.

BY Rines and Rines
Attorneys

United States Patent Office 3,206,332
Patented Sept. 14, 1965

3,206,332
ELECTROLYTIC CELL STRUCTURE
Walter Juda, Lexington, Mass., assignor to Prototech Incorporated, Cambridge, Mass., a corporation of Massachusetts
Filed Nov. 24, 1961, Ser. No. 154,724
8 Claims. (Cl. 136—86)

The present invention relates to electrolytic cell structures and, more particularly, to structures adapted for utilization in electrochemical processes, including electrodes, fuel cells, and the like.

There are numerous applications for relatively thin electronically-conductive layers or surfaces that are to be utilized as electrodes in various types of electrochemical and other processes. Unfortunately, the problem of adequately supporting such relatively thin conductive surfaces has heretofore remained largely without practical solution; so that resort has to be had to relatively thick metal or carbon electrode structures. In certain electrochemical applications where porosity of the electrode surface is required, moreover, this has introduced serious problems of fabrication.

An object of the present invention, accordingly, is to provide a new and improved supporting structure for thin electronically-conductive layers that may serve, for example, as electrodes, and that shall not be subject to the difficulties above referred to; but that, to the contrary, enables the supporting of such thin conductive surfaces, including thin porous surfaces, over both small and large areas.

An additional object is to provide a new and improved electrode structure of more general utility, as well.

In the particular utilization of electrode structures of the above-described character in processes involving the employment of electrolytic media, such as, for example, in batteries or fuel cells, there exists the further problem of containing an electrolytic medium within the space between the electrodes, consistent with providing a strong structure and provision for the removal of products or by-products in the operation of the device. In the case of fuel cells, for example, electrode reactants are customarily fed through generally porous electrodes into an electrolytic medium between the electrodes. When the oxidant for fuel cells is some form or source of oxygen, or other oxidizing agent, such as a halogen gas, the electrode structure, as before-described, is porous in order to enable the introduction of the oxidizing agent into the cells; and means must be provided for the removal of by-products from the cell. During such electrochemical oxidation, electrons are transferred from the fuel to the oxidizing reactant, such as the oxygen, through an electrical circuit that is externally connected to the electrodes. A considerable portion of the chemical energy of the fuel that is normally degraded into heat, in a steam plant, for example, can thus be converted directly to electrical work. It is therefore important to provide a thin support region with maximum electrolytic conductivity (i.e. low internal cell resistance) between the electrodes and within which region the electrochemical operation of the fuel cell may take place, together with the advantage of being able readily to introduce the fuel and oxidant into the cell and to remove by-products thereof, all consistent with providing ready adaptability for connection to external electric circuits and the like.

An additional object of the present invention, accordingly, is to provide a new and improved electrolytic cell structure that is particularly adapted for utilization in such devices as fuel cells and the like, and that enables the employment of the very thin porous conductive films, above-described, in an electrolyte-supporting structure of great strength and rigidity, of minimal thickness, and, because of the utilization of free electrolyte within the cells and the parallel straight-through nature of the cells, of low internal cell-resistance.

Still a further object is to provide a new and improved electrolyte support.

An additional object is to provide a novel electrolytic cell of more general utility.

Another object is to provide a new and improved fuel cell structure.

While the problems above-recounted exist in present-day fuel cell constructions and are believed to be materially improved by the structures of the present invention, extending the operation of such structures to high temperatures has been extremely difficult. Through the utilization of the structures of the present invention, however, all of the advantages above recounted can still be attained at high temperatures.

A further object of the present invention, thus, is to provide a high-temperature structure for electrochemical operations and the like.

An additional object is to provide a novel high-temperature fuel cell structure.

A further object is to provide a novel high-temperature electrolyte-supporting structure that is of more general utility, as well.

Other and further objects will be explained hereinafter and will be more particularly pointed out in connection with the appended claims.

In summary, the present invention contemplates the employment of an electrolyte support comprising a plurality of continuous juxtaposed substantially parallel cells of electronic-insulator material, preferably porous, as is the case with certain ceramic materials, later discussed. The term "electronic-insulator" as used herein is intended to connote materials that do not support electron conduction, such as usual insulators as of glass, ceramics, and the like, as well as ionically conducting solid materials, such as well-known ion-exchange materials, discussed, for example, in Ion Exchange Resins by Robert Kunin, 2nd ed., 1958, John Wiley & Sons, Inc., New York, chapters 5 and 11. In accordance with the invention, such electrolyte-support structures are generally provided with a thin, preferably porous, electronically-conductive layer bonded or adhered to the support to enable operation as an electrode structure for such purposes as electrochemical reactions, including fuel cell operations and the like.

Figure 2:
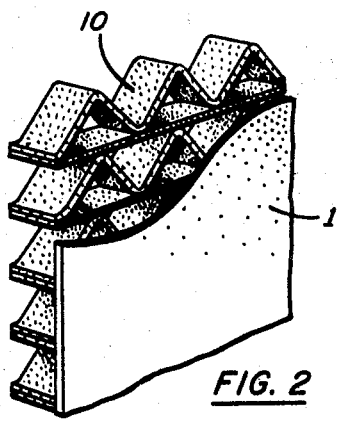

The invention will now be described in connection with the accompanying drawing, FIG. 1 of which is a perspective view, partly sectionalized, illustrating a preferred embodiment of the invention as applied to a fuel cell structure; and FIG. 2 is a similar view, upon a somewhat enlarged scale, illustrating the underlying thin-electrode-supporting structure of the invention.

Referring to FIG. 1, an electrolyte-support structure is illustrated in the form of substantially triangular-shaped continuous juxtaposed substantially parallel cells 10 of an electronic-insulator material, illustrated as a ceramic material having pores, shown as dots. Other types of preferably porous cellular supporting structures, including other honeycomb-like configurations, may also be employed, though the preferred type for the purposes herein-described will later be identified. Such substantially parallel straight-through or direct paths, moreover, are to be contrasted with prior-art fuel cell discs and the like that have much less possible open area and tortuous pore paths, introducing higher cell resistances and lower current densities.

The two-dimensional array of supporting cells 10 is shown provided, at its opposite substantially parallel faces, with thin preferably porous electronically-conductive layers 1 and 1', such as sintered metal electrodes, later described, that might otherwise not be self-supporting, but that have been found admirably to adhere in very thin layers to this type of cellular structure. The sandwich formed by the substantially parallel thin porous electrodes 1 and 1' and the intermediate cells 10, extending in the direction between the electrodes, is shown disposed within an outer housing comprising a pair of chambers 2 and 2' adjacent to the respective electrodes. The space between the side and bottom surfaces or edges of the chambers may be gasketed, sealed, or leak-proofed with an insulating substantially non-porous casing 8, extending between and contiguous with the electrodes 1 and 1', and the upper surface of which may be left open to expose a porous upper wall of the cell structure 10 for the escape of reaction products during the fuel cell operation. For high temperature operation, particularly with corrosive molten electrolytic media, such as the later-discussed sodium lithium carbonate, or sodium lithium potassium carbonate, the gasketing, sealing, or leak-proofing 8 may be effected by means of a magnesium oxide-sodium lithium carbonate paste or similar carbonate edging, such as sodium or potassium carbonate, which are solid under 800° C. and thus under the operating temperature of the cell. By saturating the electrolyte with magnesium oxide, which is chemically inert against carbonate melts, the dissolving of the magnesium oxide within the electrolytic medium may be prevented. Connected between the electrodes 1 and 1' by respective conductors 12 and 14 is an external electric circuit for extracting electric energy, the electrical load being schematically illustrated by the meter 16, and the electrode 1' serving as anode, while the electrode 1 is the cathode.

It is preferable and entirely practical that the open areas of the cells 10 be at least of the order of 50%, and preferably greater (as compared with much lower percentages available in prior-art discs that are impregnated with electrolyte), and with wall thicknesses of the cells of the order of several mils (say from 2 to 10 mils, more or less) and with a cross-dimension of the cell openings of the order of several hundredths of an inch (say from 10 to 100 mils, more or less). With certain ceramic materials, high-temperature operation, consistent with the use of a very thin sandwich structure may be obtained. Suitable structures include pyroceramic materials, such as sodium silicate, calcium silicate, borosilicate and metal oxides. If alkali media are to be employed in the cell, then the cell structure 10 should be formed from materials that are not corrosive to alkali or molten carbonates, such as magnesium-oxide based materials and the like.

In accordance with the usual practice, fuel may be supplied through an inlet 4' extending into the chamber 2'. An oxidant may similarly be fed into the chamber 2 through an inlet 4. Outlets 6 and 6' for the oxidant and the fuel, respectively, may communicate with the corresponding chambers.

The metals or other electronically-conductive materials selected for the thin electrodes 1 and 1' and suitable for fuel cell operation may include, for example, a thin silver electrode layer, preferably sintered to the right-hand face of the cell array 10, serving as the cathode structure, and a thin nickel electrode layer sintered upon the left-hand cell face to serve as the anode structure 1'; the electrodes directly contacting the free electrolyte within the cells and over a large area. Prior-art contact resistance problems and gasketing problems between electrode and electrolyte are also thus eliminated in accordance with the present invention.

The cells 10 are readily filled, for example, with aqueous electrolyte, as by immersing the completed cell in the electrolyte under vacuum suction and then releasing the vacuum to force the liquid in.

In applying the sintered conductive materials as thin, otherwise non-self-supporting layers 1 and 1', the sintering process may be carried out in a reducing atmosphere, with the conductive layer sintered below its melting point to render it porous for the purpose illustrated in FIG. 1. It has been found that extremely thin uniformly porous layers thus result; and the sub-combination of such an electrode structure, as is illustrated in FIG. 2, is useful as an electrode by itself, altogether apart from the combination of the fuel cell of FIG. 1.

As another illustration, the structure of FIG. 2 may be formed by sintering a magnetite layer 1 onto the cell structure 10 for such purposes as use as an anode in, for example, an NaCl-electrolysis cell for the production of caustic and chlorine. Magnetite has not heretofore found wide acceptance for such purposes because of large-size electrode-fabrication difficulties which are completely overcome by the present invention.

Such a structure not only enables the practical supporting of thin conductive layers, including thin porous layers, but it also provides a very rigid self-supporting structure of extremely thin dimensions. In addition, through utilization of the pyroceramic materials before described, extremely high-temperature operation may be attained with the aid of such electrode structures.

Furthermore, the usual difficulties in obtaining large uniformly porous structures are overcome by the use of large area cell structures of this character.

In a fuel cell about 2" x 2" x ½" thick, employing a porous pyroceramic or high-temperature ceramic of the nature before described, such as that manufactured by the Corning Glass Works, under the trademark "Cercor," having substantially triangular cross-section honeycomb-like cells 10 (40 mils high and 75 mils wide at the base), cell wall thickness of the order of 5 mils, and a wall porosity of about 35 to 40%, providing a substantially 70% open-face area, a thin silver electrode layer 1 was sintered to serve as a cathode over the right-hand face of the two-dimensional cell array, and a thin nickel anode layer 1' was similarly sintered over the opposite left-hand face of the cell array. This type of pyroceramic material, moreover, is dimensionally stable within a wide range of temperatures so that it permits the sintering thereto of the electrode layers, the introduction and cooling of molten electrolyte, the sealing at 8, and subsequent high-temperature cell operation—all without cracking or deformation.

With a molten-salt electrolytic-medium of $NaLiCO_3$ (melting point, 510° C.) disposed within the cells 10, and a methane-and-steam fuel introduced at 4' (about 30 cc. per minute) to the anode 1' (at 700° C., for example) and with a stoichiometric excess of flow of an air oxidant with $CO_2$, introduced at the oxidant inlet 4 for the purpose of forming carbonate ions in view of the carbonate electrolytic medium (with a ratio of $CO_2$ to $O_2$ of about unity), a current density of the order of about 25 ma./cm.[2] at terminal voltages between 0.4 and 0.6 volt may be obtained in the output circuit 16.

In other experiments, a cell of the same character, fabricated from porous magnesia ⅛" thick, filled with aqueous potassium hydroxide electrolyte, was operated with hydrogen fuel introduced at a pressure slightly above atmospheric pressure into a porous platinized nickel anode 1', and an oxygen oxidant, introduced as a gas directly to the porous silver platinized electrode surface 1. In such operation, it is preferable, in order to avoid loss of electrolyte and flooding of the electrodes, to introduce the fuel and the oxidant at substantially equal pressures or at pressure differentials such as to take advantage of the retaining action afforded by surface tension and the like between the structure and the free electrolyte therein. Greater pressure differentials are pos-

---

[1] Treatise on Powder Metallurgy, Claus Goetzel, Interscience Publishers, 1949, volume 1, chapters 14 and 15.

sible, also, by using smaller pores in one electrode than in the other. In those cases where such pressure is sizable, in order to avoid forcing out of the cell structure 10 the free electrolyte disposed therein, the whole cell may be placed in a housing containing pressurized vapor, such as steam, for preventing such escape of electrolyte.

While a preferred type of electrode and cell structure has been described, it is to be understood that other types of porous cell structures may also be employed, as may other types of materials for the electrolytic support, electrolytic medium therein, and the porous or other thin electrodes 1 and 1'.

Similarly, other well-known fuels and oxidants may be employed with structure of FIG. 1. The electrode structures of FIGS. 1, 2 and 3 may obviously also be employed in a host of other types of electrochemical and similar applications, particularly those involving the requirement for extremely thin electrode structures.

Further modifications will occur to those skilled in the art and all such are considered to fall within the spirit and scope of the invention as defined in the appended claims.

What is claimed is:

1. A supported electrode structure having, in combination, a support comprising an array of continuous, juxtaposed, substantially parallel, tubular, open-ended cells having walls of porous electronic-insulator material, a thin, non-self-supporting electrode layer of electronically-conductive gas-pervious material adhered to said support at one side thereof and covering the adjacent open ends of said cells, the cell walls extending transversely from said layer and having a length normal to said layer which is substantially greater than the thickness of said walls and said layer in order to provide rigidity for sustaining said layer, the width of said cells parallel to said layer being substantially greater than said cell wall thickness to provide a large open area for communication of the interior of said cells with said electrode layer, and means for connecting an electric circuit to said electrode layer.

2. The combination of claim 1, said cell walls having a thickness approximately 2 to 10 mils, said cells having a width approximately 10 to 100 mils, said open area being at least approximately fifty percent of the area of said side of said support.

3. The combination of claim 1, said electrode layer being sintered upon said support.

4. An electrolytic cell device comprising a support having an array of continuous, juxtaposed, substantially parallel, tubular, open-ended, electrolyte-containing cells with walls of porous electronic-insulator material, a pair of thin non-self-supporting gas-pervious electrodes adhered to said support at opposite sides thereof and covering the adjacent open ends of said cells, the cell walls extending transversely between said electrodes and having a length normal to said electrodes which is substantially greater than the thickness of said walls and said electrodes in order to provide rigidity for sustaining said electrodes, the width of said cells parallel to said electrodes being substantially greater than said wall thickness in order to provide a large open area for low resistance communication of the electrolyte inside said cells with said electrodes, and means for connecting an electric circuit to said electrodes.

5. The device of claim 4, said cell walls being pyroceramic material.

6. The device of claim 4, one of said electrodes being selected from the group consisting of nickel, silver, and magnetite.

7. The device of claim 4, said electrodes and said support being contained within a housing having a pair of chambers adjacent to the respective electrodes, means for introducing an oxidant into one of said chambers, and means for introducing a fuel into the other of said chambers.

8. The device of claim 7, said housing having edge surfaces sealed by a material containing magnesium oxide, electrolyte containing dissolved magnesium oxide.

References Cited by the Examiner

UNITED STATES PATENTS

| 406,267 | 7/89 | Currie | 136—143 |
| 1,329,180 | 1/20 | Holland | 136—143 |
| 2,880,260 | 3/59 | Strauss | 136—143 |
| 2,914,596 | 11/59 | Gorin et al. | 136—86 |

FOREIGN PATENTS 1,119,352  12/61  Germany.

JOHN H. MACK, *Primary Examiner.*

JOSEPH REBOLD, JOHN R. SPECK, WINSTON A. DOUGLAS, *Examiners.*